US012509940B2

(12) United States Patent
Hebeisen et al.

(10) Patent No.: US 12,509,940 B2
(45) Date of Patent: Dec. 30, 2025

(54) MODULAR MOTOR FOR A WINDOW SHADE SYSTEM

(71) Applicant: Mechoshade Systems, LLC, Middleton, WI (US)

(72) Inventors: Stephen P. Hebeisen, Amawalk, NY (US); Xi Ming Liarno, Bergenfield, NJ (US); Eugene Miroshnichenko, Oceanside, NY (US)

(73) Assignee: MECHOSHADE SYSTEMS, LLC, Long Island City, NY (US)

( * ) Notice: Subject to any disclaimer, the term of this patent is extended or adjusted under 35 U.S.C. 154(b) by 291 days.

(21) Appl. No.: 18/086,421

(22) Filed: Dec. 21, 2022

(65) Prior Publication Data
US 2023/0203883 A1    Jun. 29, 2023

Related U.S. Application Data

(60) Provisional application No. 63/293,481, filed on Dec. 23, 2021.

(51) Int. Cl.
| | |
|---|---|
| *E06B 9/72* | (2006.01) |
| *E06B 9/42* | (2006.01) |
| *H02K 11/00* | (2016.01) |
| *H02K 11/215* | (2016.01) |
| *H02K 11/25* | (2016.01) |
| *E06B 9/68* | (2006.01) |

(52) U.S. Cl.
CPC ............ *E06B 9/72* (2013.01); *E06B 9/42* (2013.01); *H02K 11/0094* (2013.01); *H02K 11/215* (2016.01); *H02K 11/25* (2016.01); *E06B 2009/6836* (2013.01); *E06B 2009/6854* (2013.01); *H02K 2207/03* (2013.01)

(58) Field of Classification Search
None
See application file for complete search history.

(56) References Cited

U.S. PATENT DOCUMENTS

| | | | |
|---|---|---|---|
| 3,298,197 A * | 1/1967 | Roth | E06B 9/50 |
| | | | 403/339 |
| 4,143,367 A | 3/1979 | Schestag | |

(Continued)

FOREIGN PATENT DOCUMENTS

| | | | |
|---|---|---|---|
| CA | 2996362 A1 * | 5/2018 | ............ E06B 9/322 |
| EP | 3372774 | 9/2018 | |
| WO | 2020249829 | 12/2020 | |

*Primary Examiner* — Phi D Tran
(74) *Attorney, Agent, or Firm* — SNELL & WILMER L.L.P.

(57) ABSTRACT

The system may include a motor releasably connected to a control module and the control module releasably connected to a drive module. The system may further include a joint releasably connecting the control module to the drive module, wherein the joint includes a floating gear. The method may include determining a motor shaft rotation of a motor shaft in a motor, determining a shade tube rotation of a shade tube that moves a window shade over a path, comparing the motor shaft rotation to the shade tube rotation, determining, based on the comparing, that the shade tube rotation is not equal to the motor shaft rotation and determining that an obstacle exists in the path of the window shade. The method may also include determining a change in at least one of current or torque in the motor.

18 Claims, 3 Drawing Sheets

(56) References Cited

U.S. PATENT DOCUMENTS

| | | |
|---|---|---|
| 4,856,574 A | 8/1989 | Minami et al. |
| 5,170,108 A | 12/1992 | Peterson et al. |
| 5,198,974 A | 3/1993 | Orsat |
| 5,540,269 A | 7/1996 | Plumer |
| 5,706,875 A | 1/1998 | Simon |
| 5,709,349 A | 1/1998 | De Chevron Villette et al. |
| 6,116,320 A | 9/2000 | Peterson |
| 6,181,089 B1 | 1/2001 | Kovach et al. |
| 6,243,006 B1 | 6/2001 | Rejc et al. |
| 6,536,503 B1 | 3/2003 | Anderson et al. |
| 6,680,594 B2 | 1/2004 | Collett et al. |
| 6,708,750 B2 | 3/2004 | Collett et al. |
| 6,723,933 B2 | 4/2004 | Haag et al. |
| 6,736,186 B2 | 5/2004 | Anderson et al. |
| 7,420,347 B2 | 9/2008 | Fitzgibbon |
| 7,654,300 B2 | 2/2010 | Chigusa |
| 8,176,684 B2 | 5/2012 | Marchetto |
| 8,575,872 B2 | 11/2013 | Mullet et al. |
| 8,791,658 B2 | 7/2014 | Mullet et al. |
| 8,947,027 B2 | 2/2015 | Mullet et al. |
| 9,018,868 B2 | 4/2015 | Lucas et al. |
| 9,152,032 B2 | 10/2015 | Mullet et al. |
| 9,194,179 B2 | 11/2015 | Mullet et al. |
| 9,534,442 B2 | 1/2017 | Derk, Jr. et al. |
| 9,644,424 B2 | 5/2017 | Slivka et al. |
| 9,725,948 B2 * | 8/2017 | Mullet ................... E06B 9/72 |
| 9,970,234 B2 | 5/2018 | Derk, Jr. et al. |
| 10,107,033 B2 | 10/2018 | Mugnier |
| 10,119,331 B2 | 11/2018 | Desfossez |
| 10,337,241 B2 | 7/2019 | Adreon et al. |
| 10,538,965 B1 | 1/2020 | Nguyen |
| 10,550,637 B2 | 2/2020 | Selogy et al. |
| 10,612,301 B2 * | 4/2020 | Derk, Jr. ................... E06B 9/88 |
| 11,035,172 B2 | 6/2021 | Rieper et al. |
| 2006/0232233 A1 * | 10/2006 | Adams ................... E06B 9/72 |
| | | 160/310 |
| 2006/0232234 A1 * | 10/2006 | Newman, Jr. ............ E06B 9/72 |
| | | 160/310 |
| 2008/0202709 A1 * | 8/2008 | Anderson ................ E06B 9/34 |
| | | 160/321 |
| 2010/0252211 A1 * | 10/2010 | Barnes ................... E06B 9/50 |
| | | 403/202 |
| 2011/0203748 A1 | 8/2011 | Mullet et al. |
| 2012/0090797 A1 | 4/2012 | Mullet et al. |
| 2012/0097344 A1 * | 4/2012 | Gaskill ................... E06B 9/36 |
| | | 160/168.1 V |
| 2015/0191970 A1 | 7/2015 | Yu et al. |
| 2015/0284990 A1 | 10/2015 | Hall et al. |
| 2017/0167193 A1 * | 6/2017 | Slivka ................... E06B 9/72 |
| 2019/0024452 A1 * | 1/2019 | Derk, Jr. ................... E06B 9/42 |
| 2019/0071926 A1 | 3/2019 | Hall et al. |
| 2019/0100961 A1 | 4/2019 | Kutell et al. |
| 2019/0242151 A1 * | 8/2019 | Gharabegian ...... H02K 11/0094 |
| 2020/0032583 A1 | 1/2020 | Hebeisen ................ E06B 9/88 |
| 2021/0010326 A1 * | 1/2021 | Pierce ................... E06B 9/40 |
| 2021/0189798 A1 | 6/2021 | Nien et al. |
| 2022/0205318 A1 * | 6/2022 | Graybar ................... E06B 9/72 |
| 2023/0203883 A1 * | 6/2023 | Hebeisen ................ E06B 9/68 |
| | | 160/6 |

* cited by examiner

MODULAR MOTOR FOR A WINDOW SHADE SYSTEM

CROSS REFERENCE TO RELATED APPLICATIONS

This application claims priority to, and the benefit of, U.S. Ser. No. 63/293,481 filed on Dec. 23, 2021 and entitled "MODULAR MOTOR WITH OBSTACLE DETECTION FOR A WINDOW SHADE SYSTEM," which is hereby incorporated by reference in its entirety for all purposes.

FIELD

The system generally includes a modular motor with obstacle detection and configured for use with a window shade system.

BACKGROUND

Motors used for operating window shade systems are often commodity products that various window shade companies typically source from outside motor vendors as a finished unit. Such motors often have limited flexibility and are very restricted with respect to integration and customization. While different SKUs may exist for brackets, controllers and cables, the motor usually includes an established combination of power components, drive components, communication components and control components that are all associated with one unique, fixed SKU. In that regard, a manufacturer is often forced to develop an entirely new generation of a motor, instead of incorporating incremental improvements. Additionally, when market demand changes or a client specifies a custom motor feature, the motor manufacturers usually need to re-tool and re-design the entire motor. When customers purchase the new motor, the entire old motor (with all its component parts) is typically replaced which has an impact on sustainability. Furthermore, an integrated motor typically does not allow the flexibility to meet custom bid specifications and may not be able to easily integrate with other building systems (e.g., lighting systems, building management systems, etc.).

Moreover, a motor may include a 20-year warranty, but the integrated battery includes only a 10-year warranty. However, when the battery has a problem or is depleted, the entire motor may need to be replaced, thereby negating the benefits of the full 20-year warranty term.

SUMMARY

In various embodiments, the system may include a control module releasably connected to a drive module via a joint assembly. The system may further include a head releasably connected to the control module, a joint releasably connecting the control module to the drive module, and a floating gear between the control module and the drive module. The floating gear may be in the joint that releasably connects the control module to the drive module.

The system may further include an encoder. The encoder may be located in any part of the system (reading the motor shaft rotations, reading the shade tube rotations, etc.). In various embodiment, the encoder uses the floating gear. The encoder may be between the control module and the drive module. The encoder may be in a joint that releasably connects the control module to the drive module. The encoder may further include a magnetic wheel and an encoder collar. The encoder may analyze shade tube rotations.

The system may further comprise a drive wheel releasably connected to the shaft of the drive module. A first end of a drive module may be releasably connected to the control module, and a second end of the drive module may be releasably connected to the drive wheel. The system may include a control module interfacing with at least one of a fire system, egress system or building management system. The system may include an accelerometer connected to at least one of the motor or a head. The drive module may be configured to be replaced with a different sized motor while using the same control module. The system may include a battery that is configured to interface with the motor or drive module, and wherein the battery is configured to be replaced while retaining the motor or drive module.

The motor may include one or more thermistors, wherein a first thermistor may be configured to monitor a first temperature of the motor and a second thermistor may be configured to monitor a second temperature of a pocket that houses the motor. A change in a temperature of a pocket that houses the motor may cause a change from override mode to automated mode for the window shade control.

In various embodiments, the method may include determining, by a processor, a motor shaft rotation of a motor shaft in a motor; determining, by the processor, a shade tube rotation of a shade tube that moves a window shade over a path; comparing, by the processor, the motor shaft rotation to the shade tube rotation; determining, by the processor and based on the comparing, that the shade tube rotation is not equal to the motor shaft rotation; and determining, by the processor, that an obstacle exists in the path of the window shade, based on the determining that the shade tube rotation is not equal to the motor shaft rotation. The method may also include determining, by the processor, a change in at least one of current, vibration, temperature or torque in the motor; and determining, by the processor, that the obstacle exists in the path of the window shade, based on the change in at least one of the current, vibration, temperature or torque in the motor.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
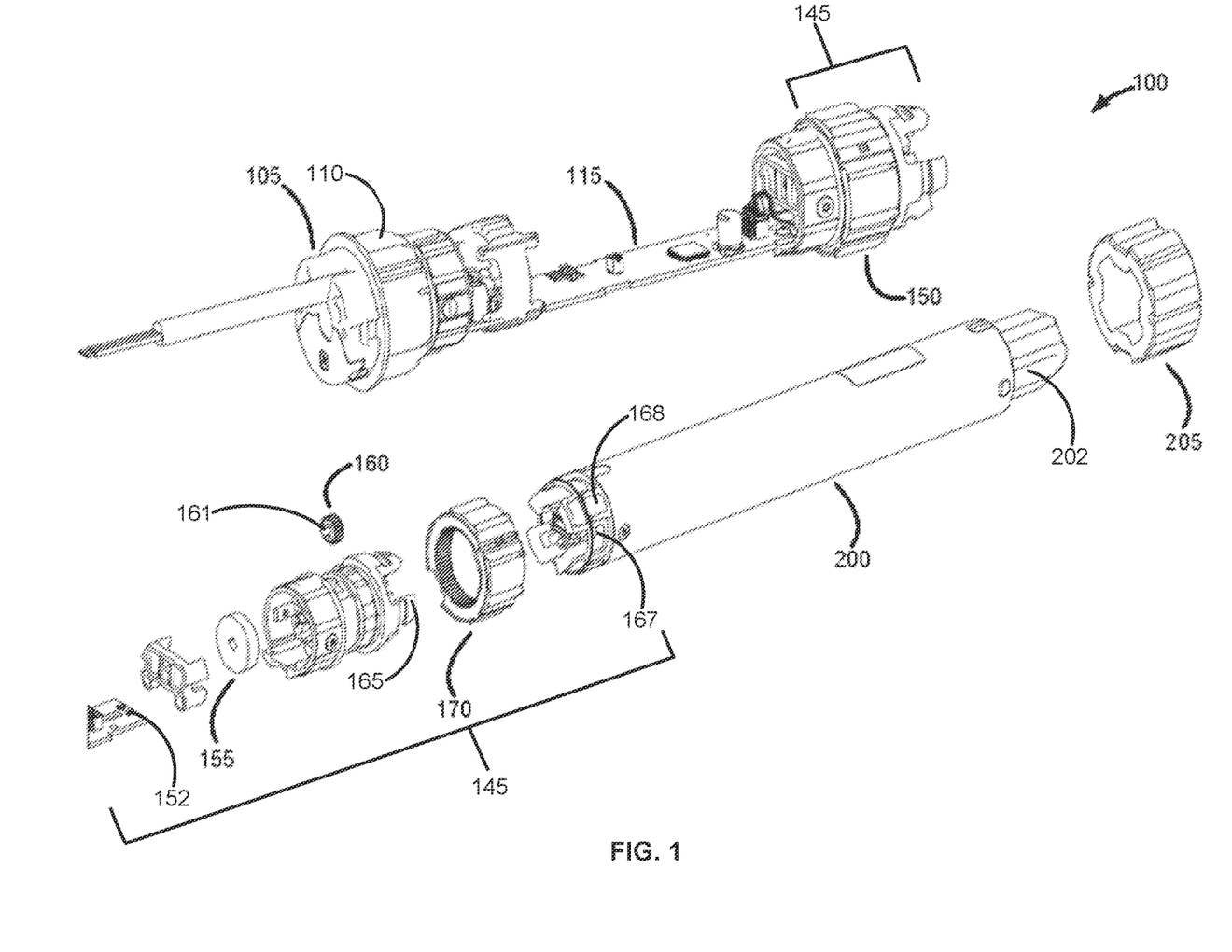
FIG. 1 is an exemplary exploded view of a motor assembly, in accordance with various embodiments.

In various embodiments, the system may include a motor assembly 100 comprising a power source, a head 105, a head adapter 110, a control module 115, a joint 145, a joint adapter 150, a drive module 200 and a drive wheel 205. All or a portion of the motor assembly 100 may fit partially or fully within a shade tube for a window shade system. The shade tube may fit over drive wheel 205, joint adapter 150 and head adapter 110. The core motor in the drive module 200 may rotate shaft 202. Shaft 202 is received within drive wheel 205 and rotates drive wheel 205. Drive wheel 205 causes the shade tube to rotate because drive wheel 205 is received within the shade tube. The stiffer material of the drive wheel 205 provides more friction against the inner surface of the shade tube, thereby causing more torque on the shade tube. In other words, if the material of the drive wheel 205 is less stiff, the outside of the drive wheel 205 may slip over the inside of the shade tube. The rotation of shade tube causes the joint adapter 150 and the head adapter 110 to also rotate. In various embodiments, the head adapter 110 rotates on a substantially frictionless bearing surface.

The motor assembly 100 may include one or more features such as a return from an override mode to an automated mode based on temperatures from the core motor and/or the shade pocket, obstacle detection, interfaces with safety systems (e.g., fire systems, life-saving egress systems, etc.), and preventative maintenance. This disclosure discusses the use of the motor assembly 100 with window shading systems, but it will be appreciated that the motor assembly 100 (or any of the components) may be configured to be used with any system or device that would benefit from one or more of these features or functions.

A modular motor design may allow for the separate sourcing of individual motor components or modules. Such components may be modular at the time of order production. The modularity may allow for the addition or removal of components to customize each motor. For example, a modular motor may allow for selection or customization of different power sources, different communication cards, different controls, different encoders, different adapters, different drive modules and/or different types of motors. Modularity may allow the separation of the motor from the gears, brake, encoder, and control board. The modularity also enables the separate troubleshooting of different modules. When market demand changes or a client specifies a custom motor feature, the manufacturer may be able to more quickly and more cost-effectively develop and incorporate the requested feature into an existing modular motor by more simply, for example, changing a component or replacing a component. The manufacture may also be able to collapse the supply chain by only needing to source individual components, instead of an entirely new motor with all of its pre-established components. To develop the modularity, in various embodiments, each component may need to be managed for sound, torque, and vibration. For example, it may be desirable for certain components to include noise reduction materials, certain materials for extra friction or certain materials to minimize vibration (e.g., urethane or other plastics). The modularity may provide for adding certain features or replacing certain components at a later time because the components may be more easily accessible. The modularity may also provide for sustainability, optimizing motor length, substituting motors, and/or substituting motor manufacturers. The optimizing the motor length may include, for example, using the same controls, but incorporating a different size motor.

The sustainability may include, for example, replacing a motor but re-using the controls. Sustainability may also include replacing the battery, but re-using other components. As such, the modular motor is the platform for future innovation. In that regard, the full motor assemblies (with different torque, speed, efficiency, vibrational characteristics, sound characteristics, etc.) can be flexibly re-assembled with the same (or similar) power supply, control and networking capability. The motor assembly 100 may also be capable of separation into components at the end of life to promote sustainable recyclability. Furthermore, the client who purchased the motor may separate out the components for return or repair, instead of having to send the motor back to the original manufacturer.

The head 105 may include any device that is configured to provide a structural attachment to any type of bracket(s). For example, the brackets may hold the drive side of the motor and tubular shade assembly. The head 105 may include, for example, one or more of bracket attachment points, a head adapter 110 (e.g., 1.79, 2.2 or 2.5 inch collar), motor lug adaptor, motor spindle adaptor, power cable, data cable, branding areas, user interface features (e.g., push buttons, LEDs, display), a pocket temperature sensor, an antenna for wireless communication, strain relief for any cables that come through the head to the outside world and/or an attachment to the motor tube structure leading to the next modular section. The cable may include one cable that integrates power, data, etc. (power over ethernet) or may contain separate cables for power and data. The cables may be configured to provide, for example, power, networking, data, communication, a connector for power, networking connections, communications connections, a connector for user interface features, etc.

The motor assembly 100 may interface with any type of power source. For example, the power source may include battery, photovoltaic (PV), power over ethernet (POE), AC power supply or DC power supply. When the motor assembly 100 includes batteries, the motor assembly 100 may house the batteries within a tube. For example, the tube may be a separate tube with an interlocking joint (that connects to other parts of the motor assembly 100) to support easy field interchangeability. The AC power supply may be universal by accepting input from all (or any subset of) international sources such as, for example, 120 VAC/230 VAC, 50 Hz/60 Hz, etc. The DC power supply may include low voltage DC supply. The DC supply may be from sources such as, for example, batteries or photovoltaic cells. Such DC sources may optimize short haul power options and minimize the number of cells. As such, the DC sources may promote better reliability and longevity. In various embodiments, the DC power supply may target higher voltage options (e.g., 24 VDC or POE (50 VDC) or higher) in order to promote lower current consumption, thereby allowing for longer wiring distances from the originating power source. Moreover, wireless power may pull energy from radio frequency. Thus, the wireless power may include a suitable internal battery storage.

The motor may be self-contained physically. The motor may be housed within its own separate tube (e.g., drive module 200). The drive module 200 may include, for example, one or more of a core motor, motor gearing, a brake, a temperature sensor, a connector (for passing electrical power and signals between the core motor in drive module 200 and other sections), a motor shaft 202, vibration isolation sections and/or an interlocking connector. The interlocking connector may be rigidly attached at the core for transferring torque from the motor attachment point at the bracket through the motor body to the motor shaft 202. As discussed, the core motor may be separately sourced and interchangeable. The assembly may incorporate different vibration reduction features and components, depending on the size, type and interfaces of the core motor included in the drive module.

The motor may include motor type options. The system may need to analyze the lift assist mechanism (LAM) and/or POE to determine the optimal type of motor. The LAM may be dependent on the POE requirements. While a LAM configurator may be used for manual shades, additional details about a LAM in general may be found in, for example, U.S. Ser. No. 16/285,555 filed on Feb. 26, 2019 and entitled "Lift Force Determining an Optimal Life Assist Mechanism," which is hereby incorporated by reference in its entirety for all purposes. The motor type options may include, for example, AC induction motor, DC brushed motor, DC coreless brushed motor, DC brushless motor, DC coreless brushless motor, stepper motor, etc. The motor gearing may also be configured to provide a variety of options for torque/speed combinations, vibration/sound combinations, etc.

The motor may include one or more thermistors for direct feedback of the temperature in the motor cavity, the temperature of the motor body itself, and/or the temperature around the motor. Additional details about detecting temperatures at different locations may be found in, for example, U.S. Ser. No. 16/796,490 filed on Feb. 20, 2020 and entitled "Maintenance And Operation Of A Window Shade System," which is hereby incorporated by reference in its entirety for all purposes.

The control module 115 may be housed within a separate tube section. The control module 115 may be self-contained or it may contain the power supply and one or more communication cards. The control module 115 may include electronics that are compatible with the type of motor. Thus, discretely different control board/card types and/or configurations may be used to control an AC induction motor, DC brushed motor, DC brushless motor, stepper motor, etc. If the core motor is replaced, the modularity of the system will allow certain components of the control module 115 to also be replaced to properly interface with the new core motor.

In various embodiments, the control module 115 may include an attachment configured as a joint 145 leading to the drive module 200, and on the other side, the control module 115 may include the power section and the communications section. The control module 115 may include features such as, for example, one or more of a DC power supply, a microprocessor for control, non-volatile memory for program storage, a non-volatile memory for data storage, volatile memory for in process calculations, a power sense and power hold circuit to store critical data when power is lost, a driver or relay for motor control, a current sensor for measuring and monitoring the current draw of the motor, a thermistor for measuring temperature at or near the motor or pocket, an accelerometer for measuring x-y-z forces impacting the motor and its operation, a motor connector, a power connector, a communication card connector, a head 105 connector for user interface connections, and/or encoder assembly.

The control module 115 may include PCB support, RF communication, PCB card, control PCB card and control unit housing. The communication section may include various options employing different media such as, for example, radio frequency (e.g., WIFI, ZigBee, Zwave, EnOcean, etc.), AC powerline communication, low voltage hardwired communication. Such options may include a variety of open or closed protocols including, for example, POE, RS-485 variants, etc. This communication section may include connectors that connect the control cards to the bus or circuit board, and/or connectors that connect cables to the building network.

In various embodiments, the control module 115 may include a central bus. A central bus may connect to all (or any subset of) the modular sections. The central bus may be configured to provide for intelligent assembly, troubleshooting and/or status checking of the sections during production and/or during operation. The central bus may identify if the sections have been assembled in a way that sufficiently matches the corresponding order configuration. For example, when connecting the cards to the bus, the cards may send to the bus an identification signal with data about the card, the order of the card and/or the location of the card. The bus may obtain such identification data from various cards to provide for intelligent assembly, troubleshooting and/or status checking of the sections during production and/or during operation.

The system may be configured to measure the current consumption. For example, a resistor may detect the current drawn from the motor and determine voltage. Depending on the location of the accelerometer, the accelerometer may help to detect drivetrain problems on the motor and/or shade assembly operations. A thermistor may measure the temperature at or near the motor or window shade pocket. However, the analysis methodology should be explicit to help distinguish between different sources of concern and action the most appropriate type of mitigation.

In various embodiments, a joint 145 may exist between the modular sections. For example, the joint 145 may exist between the control module 115 and the drive module 200. In various embodiments, the joint 145 may include one or more of a joint adapter 150, fasteners for the adapter, an encoder assembly, a control card attachment (that connects to the control module 115), a connector going through the joint and/or a crown.

In various embodiments, the encoder assembly may incorporate a variety of technologies (e.g., IR, magnetic, optical, mechanical, etc.). The encoder assembly may convert the angular position or motion of the magnet wheel 155 to analog or digital output signals, so the system can determine if the shade tube and motor shaft 202 are properly rotating together. For motor shaft 202, the system may use the known motor data provided with the motor. The motor data may include, for example, the number of rotations (e.g., over a time period), the speed of rotations, frequency of the shaft, number of actuations for a direction, current draw, cycles, operating time, internal motor temperature and/or external temperature (e.g., in the shade pocket). The system may also incorporate an encoder in or around the shaft to help determine such shaft 202 data. For the shade tube, the encoder assembly may include one or more of an encoder collar 170, a floating gear 160, a spindle 161, a magnet wheel 155 and a hall effect sensor 152. Joint adapter 150 may be positioned over encoder collar 170 or otherwise interface with encoder collar 170. As such, when the shade tube rotates joint adapter 150, joint adapter 150 in turn rotates encoder collar 170. Floating gear 160 may be positioned in parallel with spindle 161. In particular, floating gear 160 may be positioned in parallel below encoder collar 170 and above spindle 161 to allow for joint 145 (and entire motor module 100) to be a shorter length. As such, the teeth of the floating gear 160 may interface with the teeth on the inside circumference of the encoder collar 170 and the teeth on the outside circumference of spindle 161. In this manner, the floating gear 160 supports a larger gear ratio. In particular, encoder collar 170 has many more teeth, such that floating gear 160 rotates numerous times for each rotation of encoder collar 170. The larger gear ratio may also contribute to reducing the length of the joint and overall motor module, while achieving the same resultant ratio. Spindle 161 interfaces with magnetic wheel 155, such that the rotation of spindle 161 (caused by the floating gear 160 rotation) causes the magnetic wheel 155 to rotate. Hall effect sensor 152 may sense the magnetic wheel rotations and provide feedback about the number of rotations over a time period, speed of rotations, etc. As such, the encoder assembly and other components may measure (e.g., in a closed loop) the number of rotations (e.g., over a time period), the speed of rotations, frequency of the shade tube, number of actuations for a direction, current draw, cycles, operating time, internal motor temperature and/or external temperature (e.g., in the shade pocket).

In various embodiments, the encoder assembly may be located in any section or component of the motor module 100. However, head 105 may contain an antenna, LED, push button, etc., so head 105 may not have enough room for the encoder assembly. Moreover, if the encoder assembly is in or near the shaft 202 and configured to detect the rotations of the shaft 202, then it is an open loop arrangement and the encoder data may be deceptive. In particular, the encoder may detect rotations of shaft 202, but the shade tube may not be rotating similar to the shaft 202, as discussed herein, so an analysis of the shaft 202 rotation may not be fully coordinated with an analysis of the shade tube rotation. In that regard, the joint 145 may provide an extra layer of control via the encoder assembly.

In various embodiments, the joint 145 may also include a crown. The crown (e.g., 2-part crown) may comprise crown clips to hold the 2-part crown together. The crown may also include tabs 165 (e.g., 4 tabs). The drive module 200 may include snap rings 167 (e.g., 4 snap rings) that receive the tabs 165, to removably affix the joint 145 to the drive portion 200. In various embodiments, joint 145 may be separated with or without tools (e.g., via the tabs 165 and snap rings 167). The end of the drive module 200 may also include an outer covering 168 over or near the snap rings 167. In various embodiments, the outer covering 168 may be comprised of rubber and allow the joint 145 to partially or fully flex. Such flexing may allow some bending at the joint 145 and protect joint 145 from breaking.

The drive wheel 205 may include any device configured to engage with a shade tube. The drive wheel 205 may be any device configured to engage with the shaft 202. The drive wheel 205 may be, for example, a 1.79, 2.2 or 2.5 inch diameter drive wheel 205. Because the outside of drive wheel 205 may not be snug with (or lack sufficient friction with) the inside of the shade tube, the drive wheel 205 may slip, so the rotation of the drive wheel 205 may not be fully coordinated with the rotation of the shade tube. The joint adapter 150 and/or head adapter 110 may be included to essentially balance the shade tube (further away from the shaft 202) that is being driven by drive wheel 205. In that regard, head adapter 110 may be driven by the shade tube, but head adapter 110 may not drive anything since no other components interface with its inner circumference. As such, the inside circumference of head adapter 110 may be low friction or frictionless, so such minimal inner resistance may result in little or no slippage on the outer circumference with the shade tube. The system having a 1.79 inch diameter shade tube may not require a joint adapter 150 and/or head adapter 110 because such a smaller diameter shade tube may better engage over the outer surface of the control module 115 and/or drive module 200. The system having a 2.2 or 2.5 inch diameter shade tube may include a 2.2 or 2.5 inch joint adapter 150 and/or head adapter 110 since the wider shade tube is wider than the control module 115 and/or drive module 200.

The system may use historical (or trend) data such as, for example, historical current monitoring, historical accelerometer data, historical temperature data and/or historical encoder data. The system may compare the historical data to current data or trend data to determine if a problem exists, an obstruction exists, maintenance is needed or performance is being impacted. For example, if the system is detecting less current or if the encoder is detecting less rotations than in the past, the shaft 202 may be rotating slower than in the past. Moreover, if the accelerometer is detecting more vibration than in the past, then the connection points may be getting weaker or bolts may be loosening.

The system may include a wireless room control addressing scheme. The system may include radio frequency (RF), repeaters, mesh networks, direct frequency transceivers and/or a serial connection for various types of communication and/or to extend wireless reliability to cover large areas or entire floors. Such an arrangement may allow for communication with multiple motors or motor assemblies 100 in multiple rooms. The use of the serial network may provide a back-up for the RF communication. In particular, the RF communication may have problems because the pockets (that hold the window shade system) are often metal, and RF may not communicate well through metal.

In various embodiments, the system may include obstacle detection. The encoder 170 may help to determine (and/or obtain feedback on) any obstructions in the way of the window shade movement path. The encoder 170 scheme may obtain data on (and provide information on) tube rotations and adjustments, and may include the use of historical data or trend data. For example, when an obstruction exists, the motor shaft 202 may rotate, but the shade tube may not be fully or partially rotating because the obstruction is fully or partially blocking the shade path. By knowing when an obstruction may exist and/or when the shade tube is not rotating in full or partial conjunction with the motor shaft 202, the system may be able to implement more proactive measures (e.g., shutting down the motor). The proactive measures may prevent or minimize damage to the motor or other components, as part of preventative maintenance.

Encoder 170 may interface with control module 115. In various embodiments, encoder 170 may measure rotation between head 105/control module 115 and shade tube, drive module 200 and shade tube, or both. Encoder between the head 105 and shade tube provides data about how far the load has moved. An inconsistent change in tube rotation can identify the presence of an obstacle in the hembar path. In various embodiments, encoder 170 located between the drive module 200 and the shade tube provides data about the distance the drive was driven. Having encoder 170 in both locations allows the system to synchronize the timing of the drive module 200 rotation and the resulting changes in tube rotation. Because speed often varies with DC motor drives, the system provides the opportunity to ramp up and down to start and stop. Having encoder 170 in both locations allows the determination of latency between the resulting tube rotation for a given shaft rotation that may help determine when an obstacle has interrupted rotation.

Preventative maintenance may be determined based on the number of actuations in each direction, the number of cycles (e.g., full or partial up/down), operating time (e.g., in seconds, minutes or hours), the accelerometer levels, the internal temperatures and/or the pocket/external temperatures. The accelerometer levels may be based on 3-axis thresholds, wherein the baseline is set based on the thresholds after the limits are set. The system then compares the baseline to the full cycles. As the motor ages, the system may determine a modified baseline due to gradual changes to allow the baseline to be more accurate for acute events. However, the system may keep the original baseline for comparison. To determine internal temperature, the system may determine an average reading over a full cycle after the limits are set (and after sufficient rest for the motor). The system may include a maximum threshold for the internal temperature such that, if the maximum threshold temperature is exceeded, the system may create a notification to request preventative maintenance. The system may also provide a notification to request preventative maintenance in response to, or in anticipation of, a temperature threshold reached during acute events. More particularly, the system may identify when the external/pocket temperature is increasing or decreasing. The system may track the temperatures and set an alarm or trigger for increasing or decreasing pocket temperature. The system may adjust the pocket temperature. For example, after a pocket temperature exceeds a peak temperature, then reduces a certain percentage from the peak temperature, the system may send an instruction to start retracting the window shade a small amount (then retract another small amount step-by-step). If the pocket temperature continues to decline, then the system may continue retracting the window shade. The retracting may continue until the window shade is fully open or some other automation setting establishes an optimal position of the window shade to provide the motor with protection against the heat.

The system may have the capability of determining obstacles in the path of the window shade (e.g., an obstacle hitting a hembar, etc.). The window shade may or may not include physical side guiding channels which act to planarize the window shade fabric attached between the roller tube and the hembar. The obstacle detection may detect hard objects and/or soft objects. The obstacle detection may protect against a false positive and/or against a false negative.

More specifically, when setting up a window shade system, limits are set at the top and bottom of the shade path, so the system records the appropriate stop points. The system (e.g., motor) may also store a wave form (e.g., baseline wave form at install) that is learned by running the motor over a full cycle of the window shade to the top and bottom of the shade path. The baseline wave form typically has a predictable pulse train over time with similar time intervals. As such, the system stores information from the encoder about the expected transitions of the window shade. The system may also store or obtain baselines and profiles related to the accelerometer, the current and encoder. The baseline wave form may be managed in real-time and change over time. For example, if the transition is delayed in any way, longer pulses may exist which may impact the wave form. Such an obstacle may also cause an increase in the current draw. The accelerometer may also detect vibrations that are caused by the obstacle impacting the window shade, so based on the vibration data, the system may also determine that an obstacle may exist.

Based on the changes to the wave form, current draw data, temperature data, and/or vibration data, the system may use any type of algorithm, machine learning, artificial intelligence and/or fuzzy logic to determine the probability that changes (e.g., delayed window shade movement) are being caused by an obstacle. In other words, the probability of an obstacle event increases, if the data from different sensor inputs (e.g., current, accelerometer and encoder timing) shows an obstacle. By using a shaft encoder and a tube encoder, the use of a baseline to analyze encoder pulse timing may be reduced. The system may also analyze historical wave forms to determine if the window shade experienced similar impacts on the wave form in the past. If the current impact on the wave form is similar to past altered wave forms where the system determined that the input was not relevant (e.g., false obstruction or not problematic obstruction), the system may determine that the similarly altered wave form is also not relevant. As such, the system may not implement any adjustments, or implement minimal adjustments. If the current impact on the wave form is similar to past altered wave forms where the system determined that the input was a problem (e.g., based on a problematic obstruction), the system may implement adjustments (e.g., shutting down the motor).

More particularly, in various embodiments, a motor assembly may comprise of four components that may impact the ability to perform obstacle detection. The shade tube (component 1) may interface with the shade mechanism via a motor drive wheel, outer encoder gear ring and end tube flanges. The motor (component 2) may interface with the shade tube via a drive wheel. The control card (component 3) may contain a microprocessor, magnetic sensors, accelerometer and other supporting components. The encoder assembly (component 4) may contain an outer gear ring, floating gear, inner shaft gear and magnetic wheel. The control card may include firmware that may decode the two, quadrature, magnetic signals to produce a positive or negative going count based on rotation of the magnetic encoder wheel. The magnetic encoder wheel may be connected through gearing to the outer shade tube. In various embodiments, the detection algorithm may analyze acceleration. In various embodiments, the detection algorithm may not include acceleration because the bracket may not have the spring loading in the bracket to promote acceleration.

In various embodiments, as the shade is lowered, the shade material is under tension from gravity acting on the shade material and an the attached hembar. As such, the shade material is often semi-taught. The control card is configured to read the encoder pulses and measure the time difference between each pulse. The time difference may be in micro-seconds between each pulse. The time difference may be averaged over a selectable number of counts (particularly when instantaneous readings may be difficult to obtain). During calibration, the time differences are measured as the shade moves down. The system calculates an average, a maximum value and a minimum value. The system also saves a max/min count for the middle position and fully extended position of the window shade. The max/min count may be used to determine the sensitivity change or slope as shade material is unrolled from the middle region to the bottom position. To help save memory and processing power, the system may analyze the bottom 50% of movement of the shade (the middle position to the fully extended position) for detecting obstacles since bulk of the obstructions are in that range.

During operation, in various embodiments, the system may measure the change in encoder values and compare the changes to the stored (calibrated) values. The calibrated values may be reduced at a rate determined by the calibration slope from the middle position to the bottom position. In response to the hembar hitting an object, some of the kinetic energy is reflected back up through the shade material to the shade tube, which in turn slows down the rotation of the shade tube. This change may be extremely small and very short in duration. The control board firmware may resolve to 1 microsecond to detect the change in rotation by seeing a change in encoder delta time. If a change in the encoder value exceeds the maximum or minimum value by a register selectable count, then the system determines that an obstacle is detected. The system may maintain a register including Max (Maximum change in encoder value in micro-seconds), Min (Minimum change in encoder value in micro-seconds), Slope (Max/Min sensitivity x/y slope value) and/or Count (Value of contiguous max/min readings for detection).

The sensor inputs that help identify thresholds for obstacle detection may be impacted by certain shade characteristics. For example, the shade characteristics may include direction of the shade, shade position (e.g., ramp time may have more of an impact), speed of the window shade and/or shade size/weight v. hembar weight. The sensor inputs may reduce false positives. The sensor inputs may include, for example, encoder count (that may determine speed and deceleration), current input, joint/motor accelerometer input, wind sensor and/or hembar accelerometer.

The obstacle detection may be more accurate based on different factors. When determining obstacle location in the vertical direction, the bottom 25% may be the most accurate for obstacle detection, then the top 25%, then the middle. When determining obstacle location in the horizontal direction, the side may be most accurate, then the middle. A concealed hembar may provide the most accurate obstacle detection, then an external hembar, then an external weighted hembar. A 10 ft maximum shade size may provide the most accurate obstacle detection, then 20 ft maximum, then 30 ft maximum, then over 30 feet. An object type of sold/hard/fixed may provide the most accurate obstacle detection, then solid/hard/mobile, then soft/fixed, then soft/mobile. A shade direction of top-down may provide the most accurate obstacle detection, then sloped, then cables/channels/rollers, then bottom-up, then horizontal.

Moreover, different window shade configurations may experience different blockage issues. For example, a standard top down shade trying to move in the down direction may experience a complete blockage at the shade opening. Such a blockage may result from the hembar being completely or partially caught, so the hembar stays stationary and parallel to the ground as the shade unrolls. As another example, the window shade may experience a complete blockage at one side of the window shade opening. Such a blockage may result from the hembar being impeded only on one side, while the other side of the hembar continues to travel downwards. As another example, a partial blockage may occur whereby the window shade will continue moving down but with impediments. Such a blockage may result from the hembar being crooked. A crooked hembar may result from one side having more resistance than the other side, such as when the guide cables are not aligned. However, the current draw for the motor to lower the window shade may be low because the gravity helps the motor lower the window shade. As such, due to the low current data, the system may have a hard time differentiating between real obstacles and noise (e.g., false data) on the way down. A larger amount of current draw exists when raising a window shade, so the differences in current draw and encoder pulses (over noise) due to obstacles may be more prominent on the way up. However, the encoder count may be accurate on the way up or down, if the encoder pulses or forecastable.

One of the greatest impacts of a blockage may exist as the window shade is near the bottom of its travel. When the window shade is at the bottom of travel, the hembar imparts minimal weight (unweighting of the hembar), so the remaining hanging weight of the fabric is significant. However, it may be harder to detect an appreciable change in the hanging weight for narrower and taller window shades because of the reduced starting weight of the fabric. Moreover, the softer the fabric, the more the fabric may react by bunching up (instead of the fabric impacting the shade tube movement). Conversely, the stiffer fabric may not bunch up, and instead, may impact (impede) the shade tube movement, causing, for example, encoder assembly to detect that the encoder collar 170 (and/or joint adapter 150) is rotating differently than the shade tube. In contrast, it may be easier to detect an appreciable change in the hanging weight for a wider and shorter window shade because most of the weight is concentrated near the bottom of the window shade. As such, the blockage may be easier to detect when the hembar is near the top of its travel because the weight of the hembar pulls on the fabric which causes the encoder collar 170 to rotate.

A standard top down window shade moving in the up direction may experience the hembar getting caught on something rigid. The impact may be in the middle of the hembar, or on one of the sides of the hembar. Such a blockage may be easy to detect due to a sudden change in current. However, the hembar can meet resistance, but keep moving due to either getting hung up on something light or flexible (e.g., a plant or a bag that someone placed next to the hembar) or guide cables that are not aligned. In such a situation where the hembar keeps moving, it may be harder to detect the blockage, depending on the threshold of resistance.

A window shade traveling in a channel may provide more stiffness to the fabric such that any obstruction will more quickly impact the rotation of the encoder collar. A top down shade moving in the down direction within side channels may experience the hembar coming to a halt with the fabric being completely trapped in the channel as the shade tube continues unspooling fabric, so the fabric wrinkles. Additional details about a window shade system with side channels may be disclosed in U.S. Pat. No. 10,253,563 (U.S. Ser. No. 15/435,609) filed on Feb. 17, 2017 and entitled "Base Channel Coupling" which is hereby incorporated by reference for all purposes. The fabric zipper can also be hung up at the entrance of the zipper channel on one side or both sides. Such a situation may cause the fabric to either bunch up, wrinkle or unspool behind the zipper channel. The fabric zipper may also come out of the zipper channel on one side or both sides due to a misalignment or damaged teeth, but the shade may continue on its way down with the zipper outside the channel. Obstructions for channeled shades that cause the hembar to stop may be easier to detect since the motor goes from being subjected to the full hanging weight of the fabric and hembar to zero (or minimal) hanging weight, as the fabric bunches up inside the zipper channel. The fabric may also enter (or walk) into the bracket in either direction, such that the fabric may cause a change in torque that is experienced by the motor. Such change in torque of the motor may be detected (change in current draw, etc.) to determine that the fabric may have problems.

Many of the above obstructions concentrate on vertical changes in load to the window shade that essentially result in a change in torque and subsequently current draw in the motor. However, the fabric band may travel up and down without going through relative changes, but the fabric band may still experience lateral load causing the window shade and hembar to swing during operation (without hitting something or with minimal interaction). The window shade and hembar may also swing during operation and hit items on the way up. Even without obstructions, the tube may still experience changes in torque (sometimes drastic changes) due to failures in the shade tube system. Such failures may include, for example, the drive wheel 205 stripping or coming off completely during operation resulting in the window shade unspooling (either a partial turn or uncontrollably). The shade hardware on either end of the shade tube may fail during operation. Such problems may be detected by the accelerometer or the encoder assembly. The accelerometer may detect frequency or height anomalies in the wave forms, so the system may determine that a problem exists based on such anomalies. The encoder assembly may determine that the drive wheel 205 is not turning in conjunction with the joint adapter 150, so the system may determine that a problem exists based on such differences. Moreover, the drive cables may experience a loss in a tension shade operation. The loose guide cable may still engage with the shade tube, but a lag may exist in the adapter which is detected by the encoder assembly.

To enhance obstacle detection, the motor may be attached to the bracket in a variety of ways. The system may or may not be rigidly mounted to its bracket. For a bracket using the U-shaped motor lug retainer, the bracket is mounted in two configurations, with the U facing up and with the U facing sideways. A square lug may be used and be received within the U-shaped motor lug retainer. Such a configuration may minimize rocking of the motor system. In either configuration, the recommended way of securing the system is with a cotter pin, which secures the system, but allows a bit of lateral and rotational play in the attachment. Installers may use a screw which rigidly secures the motor. The system may also include a cross shaped motor lug or a triangle shaped motor lug. Such a cross configuration may allow the motor system to rock to minimize damage to the motor system. However, the cross, triangle or any other lug configuration may also include a urethane or rubber type material between the lug and the bracket to reduce vibration, noise and damage. Making the motor attachment more of a balance point can make the internal accelerometer more sensitive to changes in window shade weight, and thus, the accelerometer may be more sensitive to movement and/or obstacles.

Figure 2A:
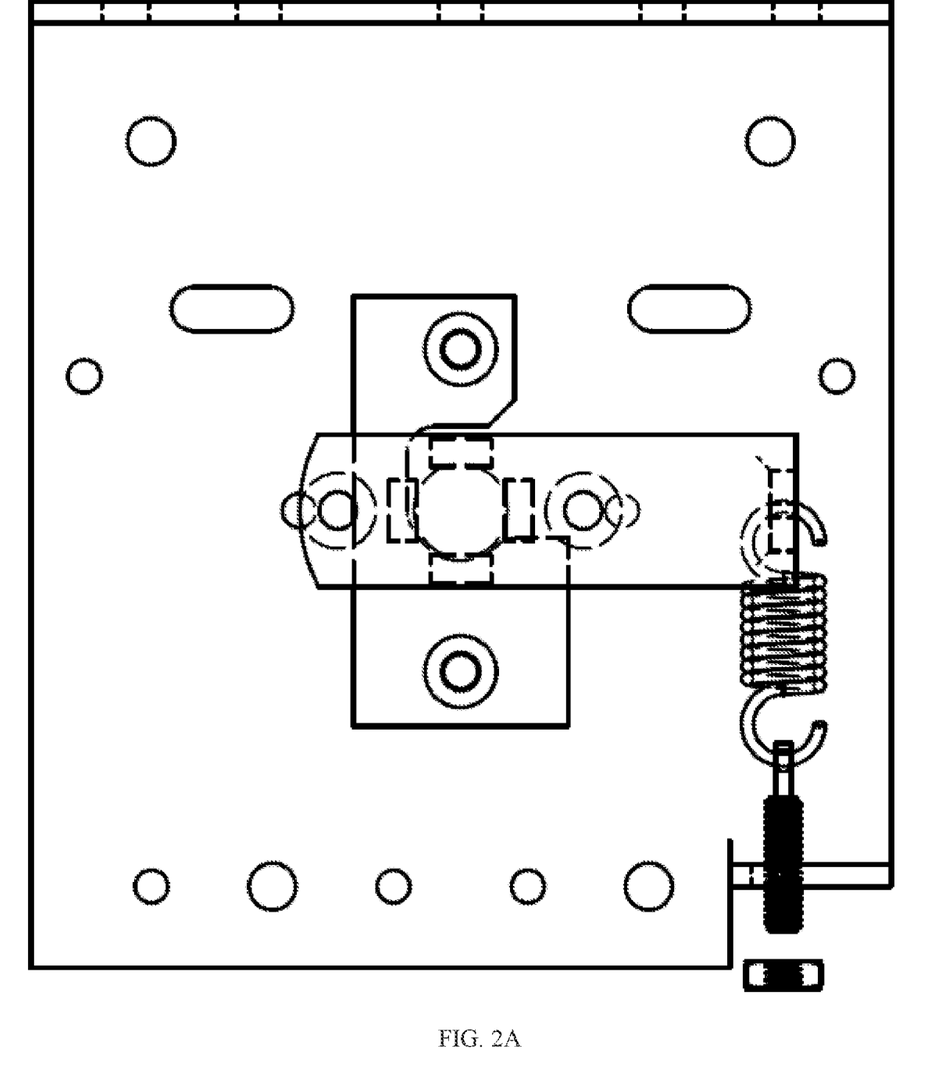
FIGS. 2A and 2B show exemplary spring-loaded mechanisms within the bracket attachment to the motor, in accordance with various embodiments.
Figure 2B:
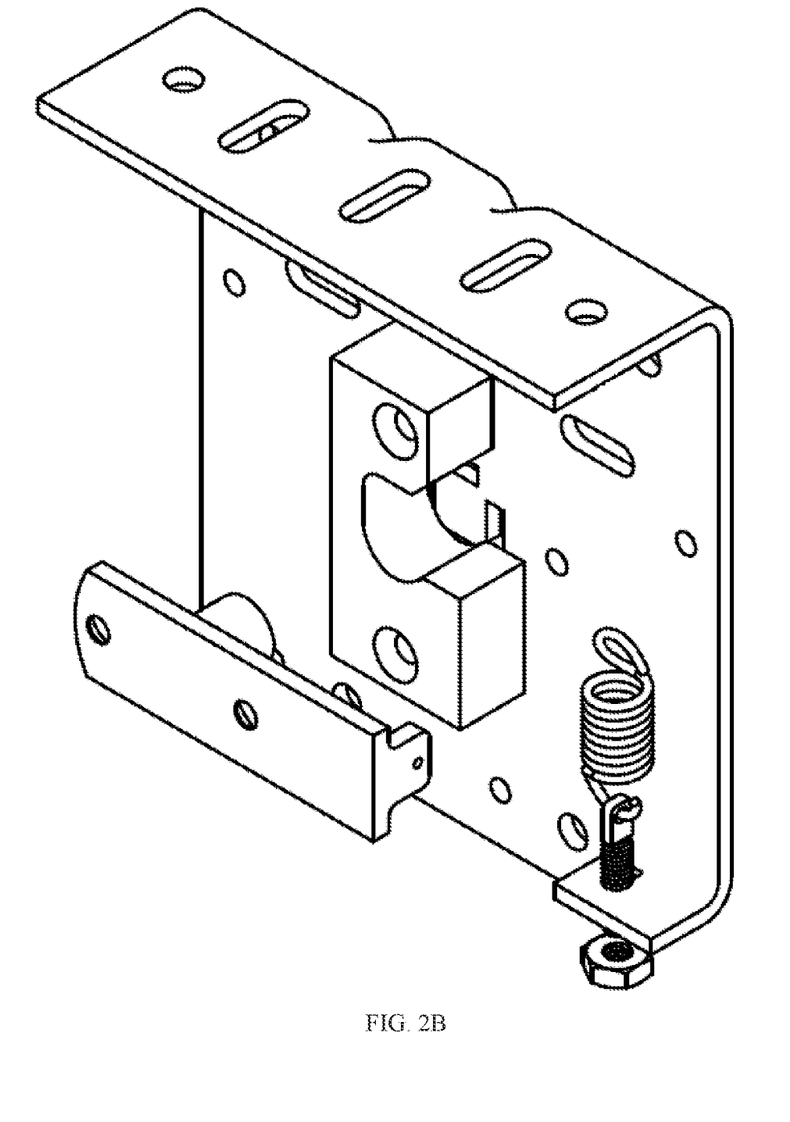

In various embodiments, and as set forth in FIGS. 2A and 2B, the system may combine a spring-loaded mechanism within the bracket attachment to the motor. The spring may help to accentuate motor rotation, in response to an abrupt change in load being experienced by the motor. This spring-loaded mechanism within the bracket may help accentuate the timing change in the tube encoder response, while also coupling in an accelerometer change with the motor rotation. Having both accelerometer change and encoder change simultaneously can also help validate true obstacle impacts and minimize false detections in the presence of "noise" in the system. In various embodiments, one or more springs may be located anywhere on the bracket and/or on the motor. For example, FIGS. 2A and 2B show a spring interfacing with one end of the horizontal arm. A first spring may interface with a first end of the horizontal arm and a second spring may interface with a second end of the horizontal arm. One or more springs may interface with the foot (or top) of the bracket. A spring with radial tangs on each end may interface with (or placed around) the center shaft with each tang providing force above or below one or more of the projections around the center shaft.

Having an accelerometer in the control module 115, drive module 200 or other components may not be sufficient or may provide unreliable data. For example, the drive wheel 205, the hembar and other components may provide dampening of certain vibrations (e.g., at the shade tube or the window shade), prior to the vibrations reaching the accelerometer. As such, the accelerometer may not receive all of the actual vibrations, so the accelerometer may provide inaccurate data.

In various embodiments, the hembar may include an accelerometer or a wind sensor. The wind sensor may detect horizontal, vertical and/or lateral movements. The wind sensor may be powered by battery, solar, rechargeable battery, etc. The wind sensor may have thresholds, such that in response to a threshold being exceeded, the wind sensor provides a notification or alarm. The wind sensor (when installed on the shade or hembar) may be programmed by shaking the shade or hembar, wherein the memory of the wind sensor may record the magnitude of the movement that should not be exceeded. The wind sensor may include a programming button to initiate programming. The wind sensor may include a sensitivity adjustment button to adjust sensitivity. If the sensor is removed from the support base, the sensor may be deactivated (and may prevent unintended shade movement). The accelerometer or wind sensor may communicate with the system via wired, wireless or radio frequency communications. The wind sensor may have a range of up to 65 feet. The wind sensor may include, for example, the Somfy Eolis 3D WireFree RTS Wind Sensor that may use 433.42 MHz radio frequency. The accelerometer may be powered by any power source such as, for example, a photovoltaic cell. Such a hember accelerometer may be able to more accurately determine when the hembar hits obstructions which would cause vibrations in the hembar. The hember accelerometer and other sensors (e.g., wind sensor) may also determine if the hembar is tilted or pitched. The system may also receive feedback about the momentum or motion of the window shade based on the hember accelerometer and/or wind sensor.

In various embodiments, a sensor in the hembar may include an acceleration sensor and/or a contact closure connected to a sensor in the hembar. The sensor may be a resistive tape often used by garage door mechanisms. The hembar may comprise a two-part hembar, wherein an obstacle would allow the two linear halves to collapse and ultimately compress together making contact. The system may use a two-part hembar in conjunction with an acceleration sensor, such that the sensor may be attached to the bottom half which is collapsing up under obstacle detection.

The detection scheme may be configured to account for false positive items. In various embodiments, the system may include algorithms that minimize false positive detections of obstructions, while optimizing memory. Such algorithms may determine if for obstructions during the downward movement of the window shade, and when the window shade is between 50% and 100% closed. The torque may include an oscillatory component, and subsequent current that may be detected by the motor due to the tube system not being perfectly round. The tube system may not be perfectly round because of the spline channel, or the presence of a batten and/or stiffeners that may impact the round shape. In particular, the system may notice a deviation from the stored baseline waveform due to the wobbling distorting the pulses or causing the pulses to be asymmetric. Additionally, the drive wheel 205 (or any of the adapters or modules) may not sit completely snugly inside a shade tube due to mismatched tolerances, thereby possibly causing the shade to drop slightly every 180 degrees, causing a minute but abrupt change in the torque. In a multi-band system, the tube may experience a minute, but abrupt change in torque every 90 degrees due to the natural lose interaction (play) between the center support dog bone and the plug. In fact, with an extra band, there may be multiple sets of these abrupt changes in rapid fire fashion.

In various embodiments, the system may need to compensate for, update or re-determine the stored baseline waveform over time. The waveform may change over time due to variances from wear of the system components and degrading of the system components. As such, to obtain a more accurate analysis based on the wave form, the system may need compensate for such variances and the impact of such variances on the wave form (e.g., by re-determining the wave form).

In practice, the worst case should be tested first with easier to detect scenarios to be tested later. A 23.125-inch wide opening may be the smallest anticipated from the standard motor limits. The smallest shade of this width that may be reasonably built would be at a 1:6 ratio, or 11.5 feet tall in this case. Such a shade may represent the worst-case scenario in terms of obstacle detection. The shade may be used with or without a zipper system. The motor may also be tested across its entire operational range of speeds, with the slowest speed being the hardest to detect changes in. If it is determined that there is a dependency of the results on temperature or operating voltage, then the tests should account for the entire range.

The system may incorporate a service switch. The service switch may prevent motor operation when servicing and/or cause the system to disregard all (or a subset of) commands. However, even in service mode, the system may still be able to send signals along the bus. The service switch may disconnect line voltage from the assembly. This may avoid the need to shut off the power at the circuit breaker that may not be nearby or accessible. Such a service switch may prevent unintentional activation of the motor, while handling any of the components or when removing the drive bracket. If an obstacle is detected, the system may be put (manually or automatically) into service mode until the system is fixed or the obstacle is removed. The switch may be located, for example, in the head 105. The switch may communicate with any of the control or communication devices or software discussed herein. The maintenance switch may be similar to a maintenance switch that may exist in a dimmer-like switch. In addition to activating the service mode, the installer and/or dealer may use an app that communicates with the window shade system to active or deactivate the service switch, simplify set-up or aid in troubleshooting.

With respect to safety, a window shade may prevent fire sprinklers from hitting everywhere. However, if a window is an egress, then the window shade needs to be lifted quickly. Moreover, the system may be configured to alert the building management system (BMS) if a window shade cannot operate properly due to electrical issues or power issues (via the control and communication components discussed herein). In that regard, the window shade system (e.g., power supply) may be configured to be connected to a building back-up electrical system, batteries and/or POE to ensure back-up power. The system may also incorporate various energy saving features such as, for example, features disclosed in U.S. Ser. No. 17/395,340 filed on Aug. 5, 2021 and entitled "Systems and Methods for Energy Savings in Buildings", which is hereby incorporated by reference in its entirety for all purposes.

The system may include solar tracking systems such as the features and functions in, for example, U.S. Ser. No. 14/692,868 which is a continuation of PCT Application No. PCT/US2013/066316 filed on Oct. 23, 2013 and entitled "Automated Shade Control System Utilizing Brightness Modeling". PCT Application No. PCT/US2013/066316 is a continuation of U.S. Ser. No. 13/671,018 filed on Nov. 7, 2012, now U.S. Pat. No. 8,890,456 entitled "Automated Shade Control System Utilizing Brightness Modeling". U.S. Ser. No. 13/671,018 is a continuation-in-part of U.S. Ser. No. 13/556,388 filed on Jul. 24, 2012, now U.S. Pat. No. 8,432,117 entitled "Automated Shade Control System". U.S. Ser. No. 13/556,388 is a continuation of U.S. Ser. No. 13/343,912 filed on Jan. 5, 2012, now U.S. Pat. No. 8,248,014 entitled "Automated Shade Control System". U.S. Ser. No. 14/692,868 is also a continuation-in-part of U.S. Ser. No. 14/461,619 filed on Aug. 18, 2014, now U.S. Pat. No. 9,360,731 entitled "Systems and Methods for Automated Control of Electrochromic Glass." U.S. Ser. No. 14/461,619 is a continuation of U.S. Ser. No. 13/656,401 filed on Oct. 19, 2012, now U.S. Pat. No. 8,836,263 entitled "Automated Shade Control in Connection With Electrochromic Glass". U.S. Ser. No. 13/656,401 is a continuation-in-part of U.S. Ser. No. 13/359,575 filed on Jan. 27, 2012, now U.S. Pat. No. 8,723,467 entitled "Automated Shade Control in Connection with Electrochromic Glass." U.S. Ser. No. 13/359,575 is a continuation-in-part of U.S. Ser. No. 13/343,912 filed on Jan. 5, 2012, now U.S. Pat. No. 8,248,014 entitled "Automated Shade Control System". U.S. Ser. No. 13/343,912 is a continuation of U.S. Ser. No. 12/475,312 filed on May 29, 2009, now U.S. Pat. No. 8,120,292 entitled "Automated Shade Control Reflectance Module". U.S. Ser. No. 12/475,312 is a continuation-in-part of U.S. Ser. No. 12/421,410 filed on Apr. 9, 2009, now U.S. Pat. No. 8,125,172 entitled "Automated Shade Control Method and System". U.S. Ser. No. 12/421,410 is a continuation-in-part of U.S. Ser. No. 12/197,863 filed on Aug. 25, 2008, now U.S. Pat. No. 7,977,904 entitled "Automated Shade Control Method and System." U.S. Ser. No. 12/197,863 is a continuation-in-part of U.S. Ser. No. 11/162,377 filed on Sep. 8, 2005, now U.S. Pat. No. 7,417,397 entitled "Automated Shade Control Method and System." U.S. Ser. No. 11/162,377 is a continuation-in-part of U.S. Ser. No. 10/906,817 filed on Mar. 8, 2005 and entitled "Automated Shade Control Method and System." U.S. Ser. No. 10/906,817 is a nonprovisional of U.S. Provisional No. 60/521,497 filed on May 6, 2004 and entitled "Automated Shade Control Method and System." The entire contents of all of the foregoing applications are hereby incorporated by reference for all purposes.

In various embodiments, the system may include a sky camera system that may provide sky forecasting. Any of the sky forecasting operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI may include mathematics, logic, philosophy, probability, linguistics, neuroscience, and decision theory. Many fields fall under the umbrella of AI, such as computer vision, robotics, machine learning, and natural language processing.

Sky forecasting may contribute to optimizing the use of the solar heat gain or the settings for other building systems (e.g., lighting, electrochromic windows and HVAC) based on existing conditions and future conditions. Sky forecasting may also contribute to identifying the optimal energy resource such as the availability of using passive energy options based on the availability of optimal environmental conditions (e.g., sky transparency, sky condition, wind speed, etc.) for buildings equipped with options onsite, remote or via utility to employ solar, wind, coal, nuclear, etc. Sky forecasting may work in tandem with such options to validate the opportunity and quality of charging and to identify when the energy source will be capable of offsetting internal demand and to what extent. The sky camera system may incorporate any of the feature or functions set forth in U.S. Ser. No. 16/849,834, which is hereby incorporated by reference in its entirety for all purposes. The '834 application is a continuation-in-part of U.S. Ser. No. 16/240,479 filed on Jan. 4, 2019 and entitled "Sky Camera System Utilizing Circadian Information For Intelligent Building Control." U.S. Ser. No. 16/240,479 is a continuation-in-part of U.S. Ser. No. 15/906,674 filed on Feb. 27, 2018 and entitled "Sky Camera System for Intelligent Building Control". U.S. Ser. No. 15/906,674 is a non-provisional of, and claims priority to, U.S. Provisional Patent Application Ser. No. 62/513,733 filed on Jun. 1, 2017 and entitled "Sky Camera System for Intelligent Building Control." U.S. Ser. No. 15/906,674 is also a continuation-in-part of U.S. Ser. No. 14/692,868 filed on Apr. 22, 2015, now U.S. Pat. No. 9,938,765 entitled "Automated Shade Control System Interaction with Building Management System." The entire contents of all of the foregoing applications are hereby incorporated by reference for all purposes.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

Any communication, transmission, and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A modular system for controlling a window shade, the system comprising:
   a drive module comprising a modular motor, a shaft and a drive wheel that is configured to drive a shade tube;
   a modular control module releasably connected to the drive module, wherein the modular control module comprises electronics that are compatible with the modular motor of the drive module; and a joint that releasably connects the modular control module and the drive module,
   wherein the joint is configured to fully separate the modular control module from the drive module, wherein the joint further comprises a joint adapter positioned over an encoder collar and the encoder collar is positioned over a floating gear, wherein internal teeth of the encoder collar interface with external teeth of the floating gear, wherein the encoder collar has more teeth than the floating gear such that the floating gear rotates more times for each rotation of the encoder collar, and wherein the floating gear rotates a spindle that in turn rotates a magnetic wheel that is sensed by a Hall effect sensor.

2. The system of claim 1, wherein the joint includes an encoder assembly that comprises the encoder collar, the floating gear, the spindle, the magnet wheel and the Hall effect sensor.

3. The system of claim 1, wherein the drive module further comprises at least one of motor gearing, a brake and a temperature sensor.

4. The system of claim 1, further comprising:
   a modular power source releasably connected to the drive module;
   a modular communication card releasably connected to the modular control module;
   a modular thermistor releasably connected to the modular motor;
   the modular motor releasably connected to the drive module; and
   a central bus releasably connected with the drive module, the modular motor, the modular control module, the modular power source, the modular communication card and the modular thermistor.

5. The system of claim 1, wherein the floating gear in the joint releasably connects the modular control module to the drive module.

6. The system of claim 1, further comprising a first encoder in the joint and a second encoder in the drive module.

7. The system of claim 1, further comprising an encoder in a hembar at the bottom of the window shade.

8. The system of claim 1, further comprising an encoder interfacing with the modular control module, wherein the encoder includes the floating gear, the magnetic wheel, the Hall effect sensor and the encoder collar.

9. The system of claim 1, further comprising an encoder that analyzes shade tube rotations.

10. The system of claim 1, wherein the drive wheel is releasably connected to the shaft of the drive module.

11. The system of claim 1, further comprising a first end of the drive module releasably connected to the modular control module, and a second end of the drive module releasably connected to a drive wheel.

12. The system of claim 1, wherein the bus provides data for at least one of assembly, troubleshooting or status checking of components at least one of during production or during operation.

13. The system of claim 1, wherein a modular thermistor includes a first thermistor that is configured to monitor a first temperature of the modular motor and a second thermistor that is configured to monitor a second temperature of a pocket that houses the modular motor.

14. The system of claim 1, wherein a change in a temperature of a pocket that houses the modular motor causes a change from override mode to automated mode.

15. The system of claim 1, further comprising the modular control module interfacing with at least one of a fire system, egress system or building management system.

16. The system of claim 1, further comprising an accelerometer connected to at least one of the drive module, the modular motor or a head.

17. The system of claim 1, wherein the modular control module further comprises one or more of a DC power supply, a microprocessor for control, non-volatile memory for program storage, a non-volatile memory for data storage, volatile memory for in process calculations, a power sense and power hold circuit to store critical data when power is lost, a driver or relay for motor control, a current sensor for measuring and monitoring current draw of the modular motor, the modular thermistor for measuring temperature at or near the modular motor or pocket, an accelerometer for measuring x-y-z forces impacting the modular motor and operation of the modular motor, a motor connector, a power connector, a connector for a modular communication card, a head connector for user interface connections, and encoder assembly.

18. The system of claim 1, wherein the modular motor further comprises a modular power source that is configured to interface with the modular motor, and wherein the modular power source is configured to be replaced while retaining the modular motor.

* * * * *